United States Patent
Cesaretti et al.

(10) Patent No.: US 10,852,161 B2
(45) Date of Patent: Dec. 1, 2020

(54) MAGNETIC FIELD ANGLE SENSOR HAVING A LOW POWER MODE AND ASSOCIATED METHODS

(71) Applicant: Allegro MicroSystems, LLC, Manchester, NH (US)

(72) Inventors: Juan Manuel Cesaretti, Ciudad de Buenos Aires (AR); Nicolas Rigoni, Buenos Aires (AR); Jesse Lapomardo, Pembroke, NH (US)

(73) Assignee: Allegro MicroSystems, LLC, Manchester, NH (US)

(*) Notice: Subject to any disclaimer, the term of this patent is extended or adjusted under 35 U.S.C. 154(b) by 111 days.

(21) Appl. No.: 16/398,522

(22) Filed: Apr. 30, 2019

(65) Prior Publication Data
US 2020/0348150 A1 Nov. 5, 2020

(51) Int. Cl.
*G01D 5/14* (2006.01)
*G01D 5/16* (2006.01)

(52) U.S. Cl.
CPC ............... *G01D 5/14* (2013.01); *G01D 5/145* (2013.01); *G01D 5/16* (2013.01)

(58) Field of Classification Search
CPC .................................. G01D 5/16; G01D 5/145
See application file for complete search history.

(56) References Cited

U.S. PATENT DOCUMENTS

| | | | |
|---|---|---|---|
| 7,714,570 B2 | 5/2010 | Thomas et al. | |
| 7,911,203 B2 | 3/2011 | Thomas et al. | |
| 7,994,774 B2 | 8/2011 | Thomas et al. | |
| 8,749,227 B2 | 6/2014 | Thomas et al. | |
| 10,380,879 B2 | 8/2019 | Haas et al. | |
| 2011/0031965 A1* | 2/2011 | Saruki ................ | G01D 5/24476 324/207.25 |
| 2012/0095712 A1* | 4/2012 | Komasaki ............. | G01D 3/036 702/94 |
| 2016/0169707 A1* | 6/2016 | Hirota .................... | G01D 5/145 702/151 |
| 2019/0113584 A1 | 4/2019 | Cook et al. | |

\* cited by examiner

*Primary Examiner* — Alvaro E Fortich
(74) *Attorney, Agent, or Firm* — Daly, Crowley, Mofford & Durkee, LLP (57) ABSTRACT

A magnetic field sensor that detects an angle of a target includes a first channel having first and second magnetic field sensing elements that are orthogonal with respect to each other and produce first and second magnetic field signals, and a second channel having third and fourth magnetic field sensing elements that are orthogonal with respect to each other and produce third and fourth magnetic field signals. The third sensing element is positioned at an angle (e.g., 45-degrees) with respect to the first sensing element. The magnetic field sensor includes a low power mode circuit that uses comparators to compare the first, second, third, and fourth magnetic field signals to a first, second, third, and fourth threshold, respectively. A processor is configured to use an output of the low power mode circuit to determine the angle of the target.

22 Claims, 6 Drawing Sheets

MAGNETIC FIELD ANGLE SENSOR HAVING A LOW POWER MODE AND ASSOCIATED METHODS

CROSS-REFERENCE TO RELATED APPLICATIONS

Not Applicable.

STATEMENT REGARDING FEDERALLY SPONSORED RESEARCH

Not Applicable.

FIELD

This invention relates generally to magnetic field sensors and, more particularly, to magnetic field angle sensors used in detecting the position of a rotating object such as a motor.

BACKGROUND

As is known, magnetic field sensors are used in a variety of applications. One example application is in motion (e.g., rotation) detectors where a magnetic field sensor is used to detect motion of an object, such as an electric motor on a steering wheel. In motion detectors, the magnetic field is typically detected by one or more magnetic field sensing elements, such as Hall effect elements or magnetoresistance elements, which provide a signal (i.e., a magnetic field signal) proportional to a detected magnetic field.

Motion detectors are widely used in automobile control systems, for example to detect motion of a target object (e.g., camshaft or steering wheel) and to provide information (e.g., an absolute angle of rotation of the target object) to an electronic steering box for controlling steering of the vehicle or to an engine control processor for ignition timing control, fuel management and other operations. With this information, the engine control processor can adjust the timing of firing of the ignition system, the timing of fuel injection by the fuel injection system and perform other operations.

Magnetic field sensors for sensing a magnetic field in low power applications are known. Some sensors implement a low power feature whereby portions of the device are activated for only a short, "awake" time interval during each clock cycle.

In automobile control systems and other safety critical applications, there are a variety of specifications that set forth requirements related to permissible sensor quality levels, failure rates, and overall functional safety. One approach to meeting such mandates has been to use redundant, identical circuits in a sensor.

SUMMARY

According to the disclosure, a magnetic field sensor configured to detect an angle of a target can include a first channel including a first magnetic field sensing element and a second magnetic field sensing element orthogonal with respect to the first magnetic field sensing element to produce respectively, first and second magnetic field signals, and a second channel including a third magnetic field sensing element and a fourth magnetic field sensing element orthogonal with respect to the third magnetic field sensing element to produce respectively, third and fourth magnetic field signals, wherein the third magnetic field sensing element is positioned at a predetermined non-zero angle with respect to the first magnetic field sensing element. The magnetic field sensor can include a low power mode circuit including a converter circuit, wherein the converter circuit is coupled to the first and second magnetic field sensing elements and configured to compare the first magnetic field signal to a first threshold and the second magnetic field signal to a second threshold, wherein the converter circuit is coupled to the third and fourth magnetic field sensing elements and configured to compare the third magnetic field signal to a third threshold and the fourth magnetic field signal to a fourth threshold, and a processor configured to use an output of the converter circuit to determine the angle of the target.

With this arrangement, the accuracy of the system can be improved by determining the angular range within which the target is positioned to a more precise angle (e.g., 45-degrees versus 90-degrees). This advantage is achieved by using at least two channels having magnetic field sensing elements offset by a predetermined angle with respect to each other. Because the angle can be resolved to within a smaller angular range than heretofore possible, asleep times associated with a low power mode of operation can be longer while still permitting accurate angle detection, thereby reducing power consumption. Furthermore, these advantages are achieved while keeping the safety benefit of using redundant channels.

Features may include one or more of the following individually or in combination with other features. The converter circuit can include a first comparator coupled to the first magnetic field sensing element that can be configured to compare the first magnetic field signal to the first threshold, a second comparator coupled to the second magnetic field sensing element that can be configured to compare the second magnetic field signal to the second threshold, a third comparator coupled to the third magnetic field sensing element that can be configured to compare the third magnetic field signal to the third threshold, and a fourth comparator coupled to the fourth magnetic field sensing element that can be configured to compare the fourth magnetic field signal to the fourth threshold. The first comparator, the second comparator, the third comparator, and the fourth comparator can each include a zero-crossing detector. The first comparator, the second comparator, the third comparator, and the fourth comparator can each include a one-bit analog-to-digital converter (ADC). A clockwise step of each ADC can correspond to a respective comparator output transition in a first direction and a counterclockwise step of each ADC can correspond to a respective comparator output transition in a second, opposite direction. The magnetic field sensor can further include a counter, and the processor can be configured to increment the counter each time the clockwise step occurs and to decrement the counter each time the counterclockwise step occurs. The processor can be configured to determine to which of at least eight angular ranges the angle of the target corresponds. The processor can be configured to output an error signal if consecutive samples of the output of the converter are not within three consecutive angular ranges of each other. The processor can be configured to output an error signal when a first angular range of the target indicated by the first or second magnetic field sensing element does not match a second angular range indicated by the third or fourth magnetic field sensing element. The angle of the target is in a first angular range indicative of 0-45 degrees if the first, second, third, and fourth magnetic field signals are greater than zero, the angle of the target is in a second angular range of 45-90 degrees if the first, second, and third magnetic field signals are greater than zero, and the fourth magnetic field signal is less than zero, the angle of the target is in a third angular range of 90-135 degrees if the first and second magnetic field signals are greater than zero, and the second and fourth magnetic field signals are less than zero, the angle of the target is in a fourth angular range of 135-180 degrees if the first magnetic field signal is greater than zero, and the second, third, and fourth magnetic field signals are less than zero, the angle of the target is in a fifth angular range of 180-225 degrees if the first, second, third, and fourth magnetic field signals are less than zero, the angle of the target is in a sixth angular range of 225-270 degrees if the first, second, and third magnetic field signals are less than zero, and the fourth magnetic field signal is greater than zero, the angle of the target is in a seventh angular range of 270-315 degrees if the first and third magnetic field signals are less than zero, and the second and fourth magnetic field signals are greater than zero, and the angle of the target is in an eighth angular range of 315-360 degrees if the first magnetic field signal is less than zero, and the second, third, and fourth magnetic field signals are greater than zero. The first and second magnetic field sensing elements can be vertical Hall plates. At least one of the first channel or the second channel can further include a fifth magnetic field sensing element and a sixth magnetic field sensing element orthogonal with respect to the fifth magnetic field sensing element. The fifth magnetic field sensing element and the sixth magnetic field sensing element can be tunnel magnetoresistance (TMR) elements. The predetermined non-zero angle can be 45-degrees.

Also described is a method for detecting an angle of a target including comparing, by a converter circuit, a first magnetic field signal generated by a first magnetic field sensing element to a first threshold, comparing, by the converter circuit, a second magnetic field signal generated by a second magnetic field sensing element orthogonal with respect to the first magnetic field sensing element to a second threshold, comparing, by the converter circuit, a third magnetic field signal generated by a third magnetic field sensing element to a third threshold, the third magnetic field sensing element being positioned a predetermined non-zero angle with respect to the first magnetic field sensing element, comparing, by the converter circuit, a fourth magnetic field signal generated by a fourth magnetic field sensing element orthogonal with respect to the third magnetic field sensing element to a fourth threshold, and determining an angular position of the target based on an output of the converter circuit.

Features may include one or more of the following individually or in combination with other features. According to the method, determining the angular position can be performed during a low power mode of operation of the magnetic field sensor. Determining the angular position of the target can include determining to which of at least eight angular ranges the angle of the target corresponds. The method can further include outputting an error signal if consecutive samples of the output of the first comparator circuit and the output of the second comparator circuit are not within three consecutive angular ranges of each other. The method may further include comparing the first magnetic field signal and the second magnetic field signal to a fifth magnetic field signal generated by a fifth magnetic field sensing element and a sixth magnetic field signal generated by a sixth magnetic field sensing element to identify an error between the first and second magnetic field signals with respect to the fifth and sixth magnetic field signals, wherein a first channel includes the first, second, fifth and sixth magnetic field sensing elements, and a second channel includes the third and fourth magnetic field sensing elements.

According to a further aspect, a magnetic field sensor includes means for comparing a first magnetic field signal generated by a first magnetic field sensing element to a first threshold to provide a first output signal, means for comparing a second magnetic field signal generated by a second magnetic field sensing element orthogonal with respect to the first magnetic field sensing element to a second threshold to provide a second output signal, means for comparing a third magnetic field signal generated by a third magnetic field sensing element to a third threshold to provide a third output signal, the third magnetic field sensing element being positioned a predetermined non-zero angle with respect to the first magnetic field sensing element, means for comparing a fourth magnetic field signal generated by a fourth magnetic field sensing element orthogonal with respect to the third magnetic field sensing element to a fourth threshold to provide a fourth output signal, and means for determining an angular position of the target based on the first output signal, the second output signal, the third output signal, and the fourth output signal.

Features may include one or more of the following individually or in combination with other features. The means for determining the angular position of the target may include means for determining to which of at least eight angular ranges the angle of the target corresponds. The magnetic field sensor may include means for comparing the first magnetic field signal and the second magnetic field signal to a fifth magnetic field signal generated by a fifth magnetic field sensing element and a sixth magnetic field signal generated by a sixth magnetic field sensing element to identify an error between the first and second magnetic field signals with respect to the fifth and sixth magnetic field signals, where the first, second, third, and fourth magnetic field sensing elements can be vertical Hall plates, and the fifth and sixth magnetic field sensing elements can be tunnel magnetoresistance (TMR) elements.

DESCRIPTION OF THE DRAWINGS

The foregoing features may be more fully understood from the following description of the drawings. The drawings aid in explaining and understanding the disclosed technology. Since it is often impractical or impossible to illustrate and describe every possible embodiment, the provided figures depict one or more illustrative embodiments. Accordingly, the figures are not intended to limit the scope of the broad concepts, systems and techniques described herein. Like numbers in the figures denote like elements.

DETAILED DESCRIPTION

Before describing the present invention, some introductory concepts and terminology are explained. As used herein, the term "magnetic field sensing element" is used to describe a variety of electronic elements that can sense a magnetic field. The magnetic field sensing element can be, but is not limited to, a Hall effect element, a magnetoresistance element, or a magnetotransistor. As is known, there are different types of Hall effect elements, for example, a planar Hall element, a vertical Hall element, and a Circular Vertical Hall (CVH) element. As is also known, there are different types of magnetoresistance elements, for example, a semiconductor magnetoresistance element such as Indium Antimonide (InSb), a giant magnetoresistance (GMR) element, for example, a spin valve, an anisotropic magnetoresistance element (AMR), a tunneling magnetoresistance (TMR) element, and a magnetic tunnel junction (MTJ). The magnetic field sensing element may be a single element or, alternatively, may include two or more magnetic field sensing elements arranged in various configurations, e.g., a half bridge or full (Wheatstone) bridge. Depending on the device type and other application requirements, the magnetic field sensing element may be a device made of a type IV semiconductor material such as Silicon (Si) or Germanium (Ge), or a type III-V semiconductor material like Gallium-Arsenide (GaAs) or an Indium compound, e.g., Indium-Antimonide (InSb).

As is known, some of the above-described magnetic field sensing elements tend to have an axis of maximum sensitivity parallel to a substrate or in the plane of the substrate that supports the magnetic field sensing element, and others of the above-described magnetic field sensing elements tend to have an axis of maximum sensitivity perpendicular to a substrate that supports the magnetic field sensing element. In particular, planar Hall elements tend to have axes of maximum sensitivity perpendicular to a substrate, while metal based or metallic magnetoresistance elements (e.g., GMR, TMR, AMR) and vertical Hall elements tend to have axes of maximum sensitivity parallel to a substrate.

As used herein, the term "magnetic field signal" is used to describe any signal that results from a magnetic field experienced by a magnetic field sensing element.

As used herein, the term "magnetic field sensor" or simply "sensor" is used to describe a circuit that uses one or more magnetic field sensing elements, generally in combination with other circuits. The magnetic field sensor can be, for example, a rotation detector to sense rotation of an object, for example, advance and retreat of magnetic domains of a ring magnet or advance and retreat of gear teeth of a ferromagnetic gear.

As used herein, the terms "processor" and "controller" are used to describe electronic circuitry that performs a function, an operation, or a sequence of operations. The function, operation, or sequence of operations can be hard coded into the electronic circuit or soft coded by way of instructions held in a memory device. The function, operation, or sequence of operations can be performed using digital values or using analog signals. In some embodiments, the processor or controller can be embodied in an application specific integrated circuit (ASIC), which can be an analog ASIC or a digital ASIC, in a microprocessor with associated program memory and/or in a discrete electronic circuit, which can be analog or digital. A processor or controller can contain internal processors or modules that perform portions of the function, operation, or sequence of operations. Similarly, a module can contain internal processors or internal modules that perform portions of the function, operation, or sequence of operations of the module.

While electronic circuits shown in figures herein may be shown in the form of analog blocks or digital blocks, it will be understood that the analog blocks can be replaced by digital blocks that perform the same or similar functions and the digital blocks can be replaced by analog blocks that perform the same or similar functions. Analog-to-digital or digital-to-analog conversions may not be explicitly shown in the figures but should be understood.

It should be understood that a so-called "comparator" can be comprised of an analog comparator having a two-state output signal indicative of an input signal being above or below a threshold level (or indicative of one input signal being above or below another input signal). However, the comparator can also be comprised of a digital circuit having an output signal with at least two states indicative of an input signal being above or below a threshold level (or indicative of one input signal being above or below another input signal), respectively, or a digital value above or below a digital threshold value (or another digital value), respectively. For example, a comparator may comprise a 1-bit analog-to-digital converter (ADC).

As used herein, the term "predetermined," when referring to a value or signal, is used to refer to a value or signal that is set, or fixed, in the factory at the time of manufacture, or by external means, e.g., programming, thereafter. As used herein, the term "determined," when referring to a value or signal, is used to refer to a value or signal that is identified by a circuit during operation, after manufacture.

In some applications such as an automobile, an electric motor can be provided to control a rotating object, such as a steering system, and a magnetic field sensor may detect the position of the motor (and, thus, the steering system or steering wheel). In this example, when the vehicle is turned "off" (e.g., the engine has turned off), it is critical that any movement of the steering wheel is tracked so that when the vehicle is then turned "on" (e.g., the engine is turned on), the actual position of the steering wheel matches with the position at which the processor interprets the steering wheel to be located based on determined target position. This is important in any instance where it is important to track movement of an object while a system, such as a vehicle, is turned off or in a low power mode, particularly if there may be any movement of the object after the power is turned off and before the power is turned back on.

Some systems turn the entire sensor on at predetermined intervals to determine the target position, and then return to sleep (no or low power) for a predetermined period of time. For example, the sensor can be fully turned on for 100-200 microseconds (μsecs) to determine the angular target position and store it, and then can go to sleep for 100 milliseconds (msecs) and then turned back on. However, with some power consumption requirements, this scheme can result in power consumption that is too high to meet the requirements and can result in inaccuracies as there is a long sleep period during which the position of the target is not being acquired. In accordance with the present disclosure, a two-channel magnetic field angle sensor can more accurately determine the position of an object (e.g., a steering wheel) while consuming less power in doing so and further can achieve these results while additionally having the safety benefit of using redundant channels.

Figure 1A:
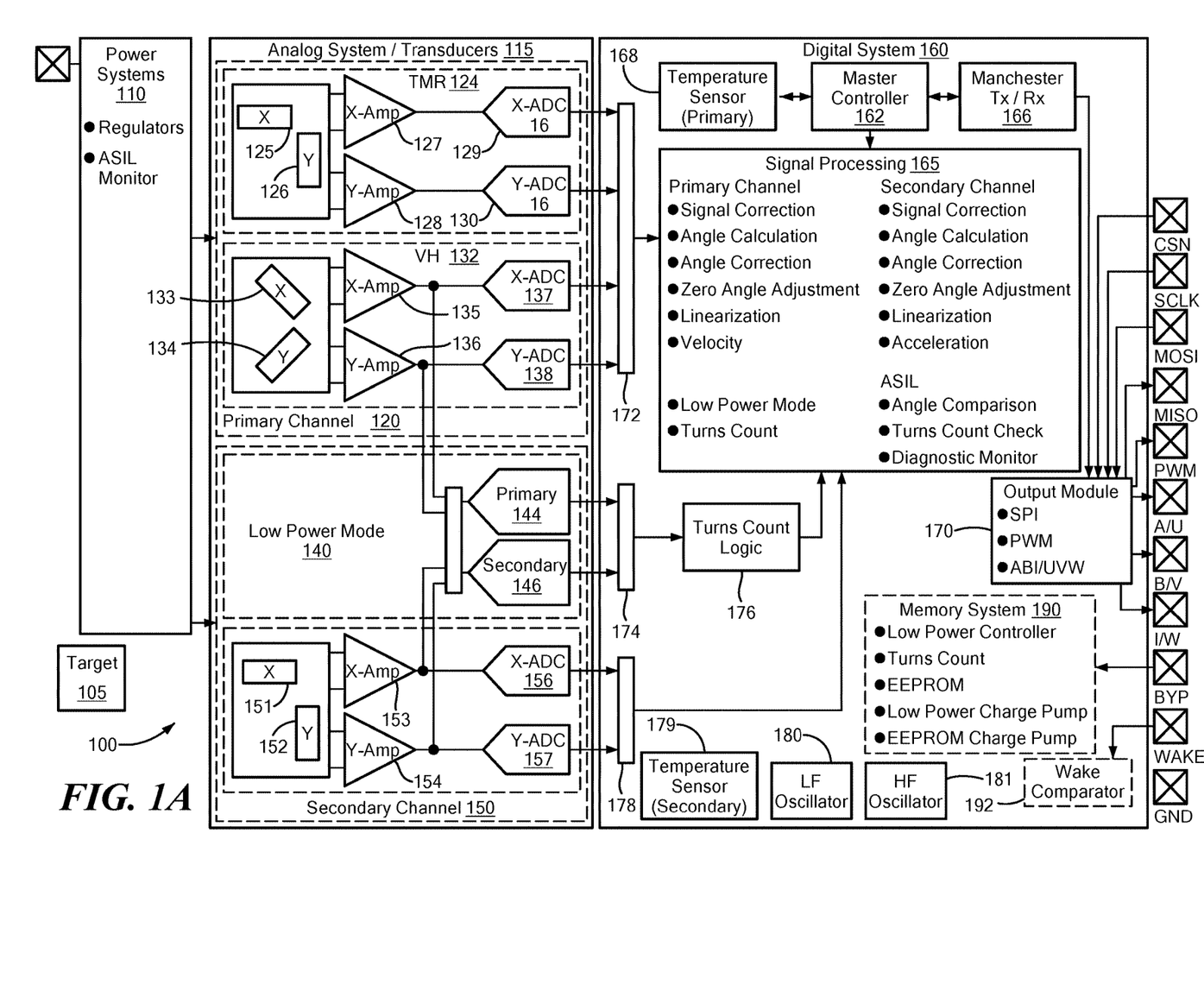
FIG. 1A is a block diagram of a magnetic field sensor including a low power mode circuit according to the present disclosure.

Referring to FIG. 1A, a magnetic field sensor 100 detects the position of a target 105 and includes a power system 110, an analog system 115, and a digital system 160. The analog system 115 includes a first (primary) channel 120, a low power mode circuit 140, and a second (secondary) channel 150. The primary channel 120 includes a full power portion 124 that is used in a full power mode of operation (e.g., when the engine is on), and a low power portion 132 that is used in a low power mode of operation (e.g., when the engine is off). The secondary channel 150 is used during the low power mode.

The full power portion 124 includes first and second magnetic field sensing elements 125, 126, which may be TMR elements or other appropriate magnetic field sensing elements or other appropriate magnetic field sensing elements. The magnetic field sensing elements 125, 126 are orthogonal with respect to each other. Each magnetic field sensing element 125, 126 is coupled to a respective amplifier 127, 128. The output of each amplifier 127, 128 is coupled to a respective analog-to-digital converter (ADC) 129, 130. The low power portion 132 includes third and fourth magnetic field sensing elements 133, 134, which may be Vertical Hall plate magnetic field sensing elements. The magnetic field sensing elements 133, 134 are orthogonal with respect to each other. Each magnetic field sensing element 133, 134 is coupled to a respective amplifier 135, 136. The output of each amplifier 135, 136 is coupled to a respective ADC 137, 138. The secondary channel 150 includes magnetic field sensing elements 151, 152, which may be Vertical Hall plate magnetic field sensing elements, or other appropriate magnetic field sensing elements. The magnetic field sensing elements 151, 152 are orthogonal with respect to each other. Each magnetic field sensing element 151, 152 is coupled to a respective amplifier 153, 154. The output of each amplifier 153, 154 is coupled to a respective ADC 156, 157. In accordance with the present disclosure, magnetic field sensing elements 151, 152 may be referred to as "first and second magnetic field sensing elements" and magnetic field sensing elements 125, 126 may be referred to as "fifth and sixth magnetic field sensing elements."

Note that magnetic field sensing element 133 is positioned at a predetermined non-zero angle with respect to element 151. This allows information from both magnetic field sensing elements 133, 134 and elements 151, 152 to be acquired and processed during the low power mode of operation. Using the primary channel and the secondary channel together, the low power mode circuit 140 is able to more accurately determine the target angle in less time, as will be appreciated in light of the present disclosure.

The low power mode circuit 140 includes a converter circuit having a primary portion 144 for receiving data from the low power portion 132 of the primary channel 120, and a secondary portion 146 for receiving data from the secondary channel 150. The low power mode circuit 140 is shown in greater detail in FIG. 1B herein and the mode of operation is described in greater detail with reference to the flow diagrams of FIGS. 5 and 6. Suffice it to say here that the low power mode circuit 140 is configured to receive the magnetic field signals from each of the magnetic field sensing elements 133, 134, 151, 152 and to determine the angular position of the target 105 during the low power mode of operation.

The digital system 160 includes a master controller 162 (which may be referred to herein as a "processor"), signal processing circuit 165, Manchester encoder 166 for transmitting and receiving data to and from the output module 170. The digital system 160 can also include a temperature sensor 168 for the primary channel. The temperature sensor can, for example, be responsive to a threshold temperature to identify an overtemperature condition of the primary channel 120 of the sensor 100. The digital system 160 can include a primary channel processing circuit 172 for receiving output signals of the primary channel 120 and providing the output to the signal processing circuit 165, and a low power processing block 174 for receiving output signals of the low power mode circuit 140 and providing the output to the signal processing circuit 165, and a secondary channel processing circuit 178 for receiving output signals of the secondary channel 150 and providing the output to the signal processing circuit 165. The digital system 160 can include a temperature sensor 179 for the secondary channel 150. The temperature sensor 179 can be responsive to a threshold temperature to identify an overtemperature condition of the secondary channel 150 of the sensor 100. The digital system 160 can further include a low frequency (LF) oscillator 180 and a high frequency (HF) oscillator 181. The digital system can further include a memory system 190 and a wake comparator 192.

During the full power mode of the sensor 100, the magnetic field sensing elements 125, 126 determine the position of an object and the output of the full power portion 124 of the primary channel 120 are provided to primary channel processing circuit 172 and to the signal processing circuit 165. During the low power mode of the sensor 100, the magnetic field sensing elements 133, 134, 151, and 152 provide magnetic field signals that are used to determine the position of the object. The output of the low power mode portion 132 of the primary channel 120 and the secondary channel 150 are provided to the low power mode circuit 140 and to low power processing block 174 and to turns count logic 176 and onto the signal processing circuit 165.

Figure 6:
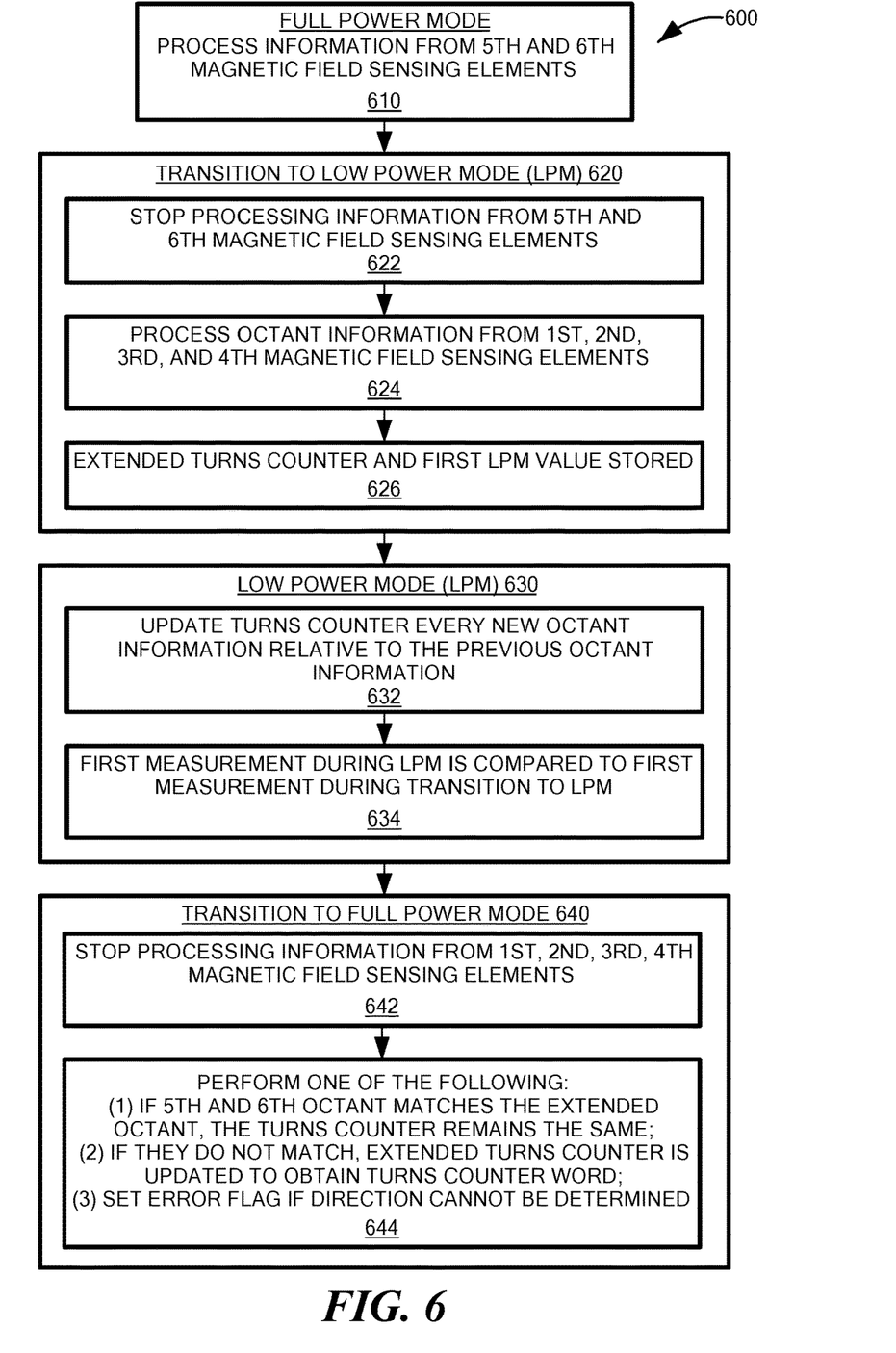
FIG. 6 is a flow diagram illustrating a process for transitioning from full power mode to low power mode and then returning to full power mode, according to the present disclosure.

By providing both TMR elements 125, 126 and Vertical Hall elements 133, 134 for the primary channel 120, when the sensor 150 returns to full power mode from the low power mode, the position detected by the Vertical Hall magnetic field sensing elements 133, 134 can be compared to the position detected by the TMR magnetic field sensing elements 125, 126 to ensure that they are providing the same position, as described in greater detail herein, for example with reference to FIG. 6. If the position of the portion 124 (determined by comparators 129, 130) does not match the position of the portion 132 (determined by ADC 137, 138), an error signal can be sent to output module 170.

Figure 1B:
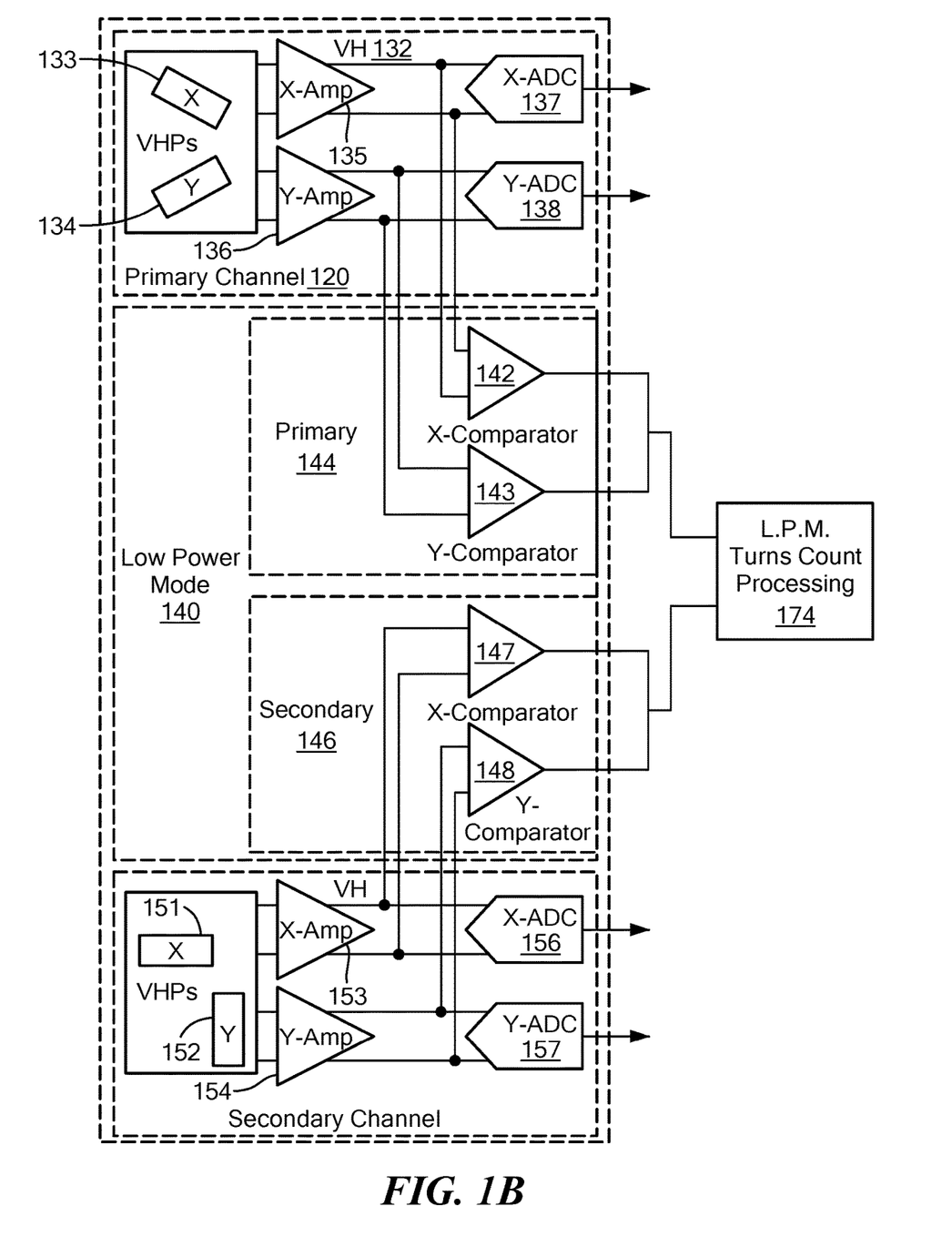
FIG. 1B is a block diagram detailing the low power mode circuit of FIG. 1A, according to the present disclosure.

FIG. 1B is a block diagram detailing an example low power mode circuit 140 of FIG. 1A, according to the present disclosure. The low power mode circuit 140 includes a converter, as may be provided by circuits 144, 146. The signal processing circuit 165 can include a processor (e.g., controller 162) configured to use an output of the converter circuit 144, 146 to determine an angle of the target. The primary portion 144 of the converter circuit includes a first comparator 142 coupled to the first magnetic field sensing element 133 via the amplifier 135. The first comparator 142 is configured to compare the first magnetic field signal from the first magnetic field sensing element 133 to a first threshold to identify a first angular range of the position of the target. The primary portion 144 of the converter circuit includes a second comparator 143 coupled to the second magnetic field sensing element 134 via the amplifier 136. The second comparator 143 is configured to compare the second magnetic field signal from the second magnetic field sensing element 134 to a second threshold to identify a second angular range of the position of the target. The secondary portion 146 of the converter circuit includes a third comparator 147 coupled to the third magnetic field sensing element 151 via the amplifier 153. The third comparator 147 is configured to compare the third magnetic field signal generated by the third magnetic field sensing element 151 to a third threshold to identify a third angular range of the position of the target. The secondary portion 146 of the converter circuit includes a fourth comparator 148 coupled to the fourth magnetic field sensing element 152 via amplifier 154. The fourth comparator 148 is configured to compare the fourth magnetic field signal from the fourth magnetic field sensing element 152 to a fourth threshold to identify a fourth angular range of the position of the target. The output of each portion 144, 146 of the low power mode circuit 140 is provided to a low power mode turns count processing circuit 174 to determine the angular position of the target. Refer to FIG. 6 for further discussion of low power mode turns count processing.

The first, second, third, and fourth comparators 142, 143, 147, 148 can each comprise a one-bit analog-to-digital converter (ADC). A clockwise step of each ADC can correspond to a respective comparator output transition in a first direction and a counterclockwise step of each ADC can correspond to a respective comparator output transition in a second, opposite direction. This can provide a value for incrementing and/or decrementing the turns count to determine the position in accordance with the present disclosure. The signal processing circuit 165 can include a counter and the processor of the signal processing circuit 165 is configured to increment the counter each time the clockwise step occurs. The processor can be configured to decrement the counter each time the counterclockwise step occurs. As described in greater detail herein, the processor (e.g., controller 162) can be figured to determine to which of at least eight angular ranges the angle of the target corresponds. The processor can further be configured to output an error signal if consecutive samples of an output of the converter circuit 144, 146 are not within three consecutive angular ranges of each other, indicating an error due to the direction not being able to be ascertained. The processor can be configured to output an error signal when a first angular range of the target indicated by the first or second magnetic field sensing element does not match a second angular range indicated by the third or fourth magnetic field sensing element, indicating that there is an error in the sensor. For example, if one sensing element says it is in within one range (e.g., 0-90 degrees) but the other sensing element says it is within another range (e.g., 180-270 degrees), this will cause an error signal to be generated.

Figure 2A:
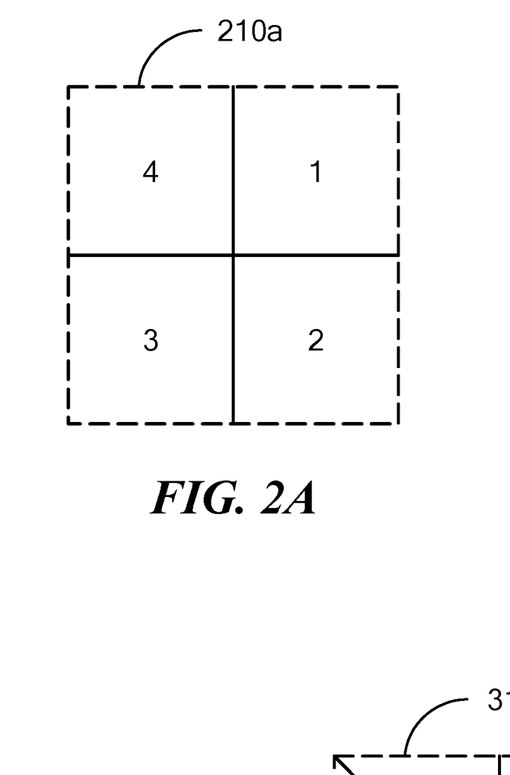
FIG. 2A shows example angular ranges ("quadrants") that can be detected by magnetic field sensing elements of a first channel of the magnetic field sensor of FIG. 1A.

FIG. 2A shows example angular ranges ("quadrants") that can be detected by magnetic field sensing elements of a secondary channel 150 of the magnetic field sensor 100 of FIG. 1A. The secondary channel (e.g., channel 150 with magnetic field sensing elements 151, 152) is used to determine the angle of the target to within one of the four illustrated angular ranges or quadrants, (1), (2), (3), (4). By implementing the two comparators (147, 148 in FIG. 1B), the angular range into which the angle of the target falls can be determined. For example, the comparator 147 is coupled to the magnetic field sensing element 151 aligned with the X-axis and can be used to compare the magnetic field signal to a threshold, such as zero, to determine if the value is greater than zero or less than zero. If the value is greater than zero, then the target is in quadrant (1) or quadrant (2). If the value is less than zero, then the target is in quadrant (3) or quadrant (4). Likewise, the comparator 148 is coupled to the magnetic field sensing element 152 aligned with the Y-axis and can be used to compare the magnetic field signal to a threshold, such as zero, to determine if the value is greater than zero or less than zero. If the value is greater than zero, then the target is in quadrant (1) or quadrant (4). If the value is less than zero, then the target is in quadrant (3) or quadrant (2). Thus, by using the output of the two comparators together, the particular quadrant in which the angle of the target is located can be determined, to thereby provide the angular position of the target. For example, if the value provided to the comparator 147 is greater than zero and the value provided to comparator 148 is greater than zero, then the angle of the target is in quadrant (4). It will be appreciated that the X-axis to which element 151 is aligned and the Y-axis to which element 152 is aligned are with respect to each other, rather than the magnetic field sensor itself.

Figure 2B:
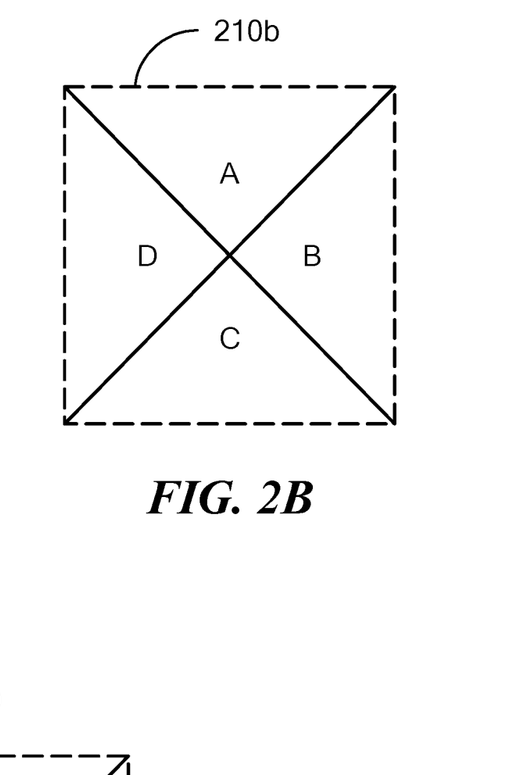
FIG. 2B shows example quadrants that can be detected by magnetic field sensing elements of a second channel of the magnetic field sensor of FIG. 1A.

FIG. 2B shows example quadrants that can be detected by magnetic field sensing elements of a primary channel 132 of the magnetic field sensor 100 of FIG. 1A. The primary channel 132 is used to determine the angle of the target to within one of the four illustrated angular ranges or quadrants: (A), (B), (C), (D). By implementing the two comparators (142, 143 in FIG. 1B), the angular range that the angle of the target falls into can be determined. For example, the comparator 142 is coupled to the magnetic field sensing element 133 which is aligned with the X-axis and can be used to compare the magnetic field signal to a threshold, such as zero, to determine if the value is greater than zero or less than zero. If the value is greater than zero, then the target is in quadrant (A) or quadrant (B). If the value is less than zero, then the target is in quadrant (C) or quadrant (D). Likewise, the comparator 143 is coupled to the magnetic field sensing element 134 which is aligned with the Y-axis and can be used to compare the magnetic field signal to a threshold, such as zero, to determine if the value is greater than zero or less than zero. If the value is greater than zero, then the target is in quadrant (A) or (D). If the value is less than zero, then the target is in quadrant (B) or (C). Thus, by using the output of the two comparators together, the particular quadrant in which the angle of the target is located can be determined, to thereby provide the angular position of the target. For example, if the output of comparator 142 is greater than zero, and if the value provided to comparator 143 is greater than zero, then the angle of the target is in quadrant (A). Likewise, it will be appreciated that the X-axis to which element 133 is aligned and the Y-axis to which element 134 is aligned are with respect to each other, rather than the magnetic field sensor itself. Accordingly, although both elements 125, 126, elements 133, 134, and elements 151, 152 used X-axis and Y-axis, it will be appreciated that these are X-axis and Y-axis of one element with respect to each other, and not necessarily the X-axis and Y-axis of the sensor 100.

Figure 4:
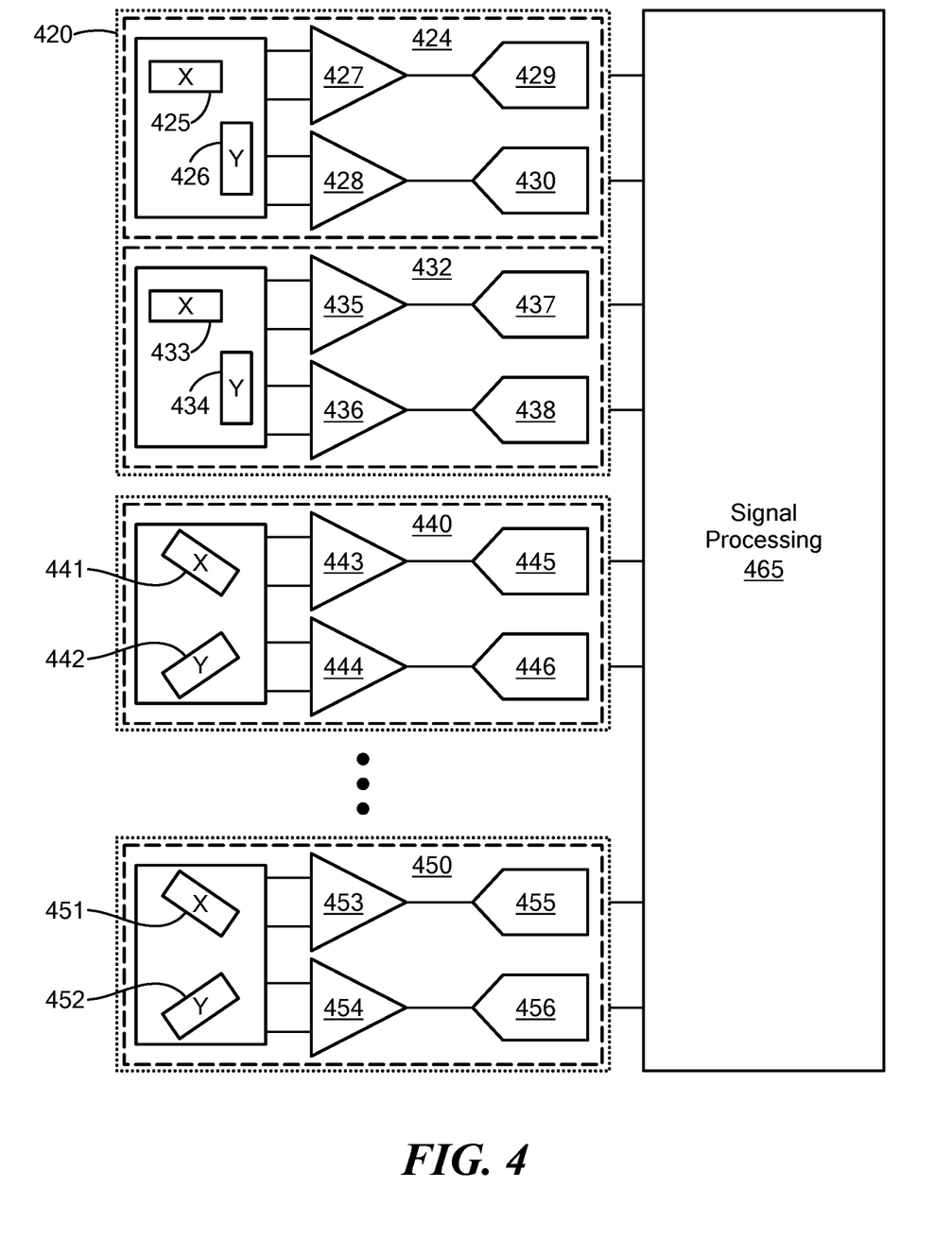
FIG. 4 shows a block diagram detailing a portion of an example magnetic field sensor having three channels and including a low power mode circuit, according to the present disclosure.

Note that because the magnetic field sensing element 133 is positioned at a predetermined non-zero angle with respect to the magnetic field sensing element 151, this provides the non-zero offset of the quadrant mapping 210a with respect to the quadrant mapping 210b. Because sensing element 151 is orthogonal with respect to magnetic field sensing element 152 and magnetic field sensing element 133 is orthogonal with respect to magnetic field sensing element 134, magnetic field sensing element 134 is likewise positioned at a predetermined non-zero angle with respect to magnetic field sensing element 152. In this example, the predetermined non-zero angle is 45-degrees, however other angles can be implemented. For example, as shown in FIG. 4, three channels can be implemented, each offset by 30-degrees, and this is scalable to any number of channels being offset by any desired predetermined non-zero angle. Three channels each offset by 30-degrees would provide 12 different possible angular ranges, thereby further improving the accuracy of the system. As another example, six channels could be implemented, each offset by 15-degrees, to still further improve the accuracy of determining position of the target and provide 24 different possible angular ranges. It will be appreciated that although elements of the primary channel portion 132 are offset by a predetermined angle with respect to elements of the secondary channel portion 150, in some instances the secondary channel portion 150 may be offset with respect to the primary channel portion 132 (e.g., as shown in FIG. 4).

Figure 3:
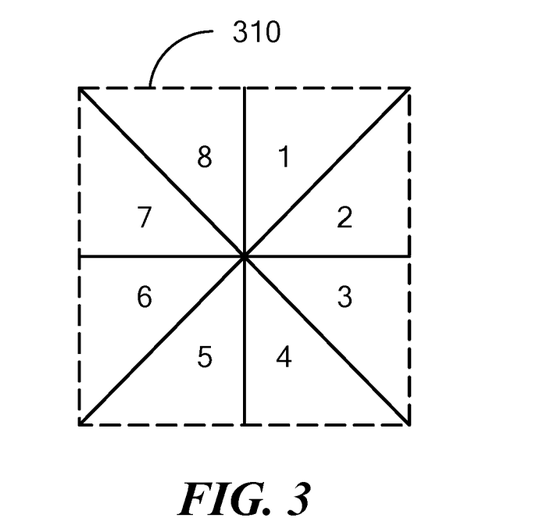
FIG. 3 shows example angular ranges ("octants") that can be detected by combining the quadrants detected by the magnetic field sensing elements of the first channel with the quadrants detected by the magnetic field sensing elements of the second channel, according to the present disclosure.

FIG. 3 shows example angular ranges ("octants") that can be detected by combining the quadrants detected by the magnetic field sensing elements (e.g., MFSE 133, MFSE 134) of the primary channel portion 132 with the quadrants detected by the magnetic field sensing elements (e.g., MFSE 151, MFSE 152) of the secondary channel 150, according to the present disclosure. Combining the information from both channels provides a higher accuracy to be able to detect the target angle to within one of 8 particular ranges, as shown in FIG. 3 and with reference to Table 1 below.

TABLE 1

| $1^{ST}$ MFSE 151 | $2^{ND}$ MFSE 152 | $3^{RD}$ MFSE 133 | $4^{TH}$ MFSE 134 | OCTANT |
|---|---|---|---|---|
| X > 0 | Y > 0 | X > 0 | Y > 0 | 1 |
| X > 0 | Y > 0 | X > 0 | Y < 0 | 2 |
| X > 0 | Y < 0 | X > 0 | Y < 0 | 3 |
| X > 0 | Y < 0 | X < 0 | Y < 0 | 4 |
| X < 0 | Y < 0 | X < 0 | Y < 0 | 5 |
| X < 0 | Y < 0 | X < 0 | Y > 0 | 6 |
| X < 0 | Y > 0 | X < 0 | Y > 0 | 7 |
| X < 0 | Y > 0 | X > 0 | Y > 0 | 8 |

As shown in Table 1, each quadrant (1) through (8) can be identified by taking the output of the comparators, given the fact that the magnetic field sensing elements are positioned at the predetermined non-zero angle with respect to each other. The angle of the target is in the first angular range (1) indicative of 0-45 degrees if the first, second, third, and fourth magnetic field signals are greater than zero. The angle of the target is in the second angular range (2) indicative of 45-90 degrees if the first, second, and third magnetic field signals are greater than zero, and the fourth magnetic field signal is less than zero. The angle of the target is in the third angular range (3) indicative of 90-135 degrees if the first and second magnetic field signals are greater than zero, and the second and fourth magnetic field signals are less than zero. The angle of the target is in the fourth angular range (4) indicative of 135-180 degrees if the first magnetic field signal is greater than zero, and the second, third, and fourth magnetic field signals are less than zero. The angle of the target is in the fifth angular range (5) indicative of 180-225 degrees if the first, second, third, and fourth magnetic field signals are less than zero. The angle of the target is in the sixth angular range (6) indicative of 225-270 degrees if the first, second, and third magnetic field signals. The angle of the target is in the seventh angular range (7) indicative of 270-315 degrees if the first and third magnetic field signals are less than zero, and the second and fourth magnetic field signals are greater than zero. The angle of the target is in the eighth angular range (8) indicative of 315-360 degrees if the first magnetic field signal is less than zero, and the second, third, and fourth magnetic field signals are greater than zero.

As will be appreciated, if two consecutive samples are not within three consecutive angular ranges of each other (e.g., first sample is in octant (1) and second sample is in octant (5), then the sensor will not be able to determine which direction the target has rotated. Thus, an error signal can be generated and output by the output module. Thus, by providing eight ranges using two sets of magnetic field sensing elements offset from each other by a predetermined angle, the target can rotate up to 135-degrees between samples in low power mode, as opposed to prior systems which only allow for 90-degrees of rotation between samples. Further, the location is determined to within 45-degrees (as opposed to 90-degrees) precision. Still further, Vertical Hall plates 133, 134 can be used for the low power mode, thereby allowing higher accuracy TMR elements 125, 126 to be used during the full power mode of operation of the sensor.

FIG. 4 shows a block diagram detailing a portion of an example magnetic field sensor having three channels 420, 440, 450, each having magnetic field sensing elements offset by 30-degrees with respect to each other according to the present disclosure. Note that the low power mode circuit is not shown in FIG. 4 but would have same structure as FIG. 1A and FIG. 1B, with a greater number of comparators (one comparator per magnetic field sensing element used in the low power mode of operation of the sensor) to compare each magnetic field signal to appropriate thresholds. According to three channels, 12 possible angular ranges can be identified.

The first channel 420 includes a full power mode of operation portion 424 and a low power mode of operation portion 432. The full power mode portion 424 includes a first magnetic field sensing element 425, which may be aligned with the X-axis, and a second magnetic field sensing element 426, which may be aligned with the Y-axis. Each magnetic field sensing element 425, 426 is coupled to a respective amplifier 427, 428. Magnetic field sensing elements 425, 426 may be TMR elements or other appropriate magnetic field sensing elements. The output of each amplifier 427, 428 is coupled to a respective ADC 429, 430. The low power portion 432 includes third and fourth magnetic field sensing elements 433, 434 which may be aligned with the X-axis and Y-axis, respectively, with respect to each other. Each magnetic field sensing element 433, 434 is coupled to a respective amplifier 435, 436. The output of each amplifier 435, 436 is coupled to a respective ADC 437, 438. The secondary channel 440 includes magnetic field sensing elements 441, 442, which may be Vertical Hall plate magnetic field sensing elements. The magnetic field sensing elements 441, 442 may be aligned with an X-axis and Y-axis, respectively, with respect to each other. Each magnetic field sensing element 441, 442 is coupled to a respective amplifier 443, 444. The output of each amplifier 443, 444 is coupled to a respective ADC 445, 446. The third channel 450 includes magnetic field sensing elements 451, 452, which may be Vertical Hall plate magnetic field sensing elements. The magnetic field sensing elements 451, 452 may be aligned with the X-axis and Y-axis, respectively, with respect to each other. Each magnetic field sensing element 451, 452 is coupled to a respective amplifier 453, 454. The output of each amplifier 453, 454 is coupled to a respective ADC 455, 456. The signal processing circuit 465 can be the same as or similar to the signal processing circuit 165 from FIG. 1A.

Note that the magnetic field sensing element 441 of the second channel 440 is positioned at a predetermined non-zero angle with respect to magnetic field sensing element 433. In this example, the element 441 is positioned at 30-degrees with respect to element 433. Likewise, the magnetic field sensing element 451 of the third channel 450 is positioned at the same predetermined non-zero angle with respect to the magnetic field sensing element 441. In this example, the element 451 is positioned at 30-degrees with respect to element 441.

It will be appreciated that although only three channels are shown, this is applicable and readily scalable to any number of channels. For example, there could be six total channels with each channel having a magnetic field element offset by 15-degrees with respect to the prior channel, in which channel 450 would be the sixth channel, and would be offset by 75-degrees as compared to the magnetic field sensing element 433 of the first channel 432.

Figure 5:
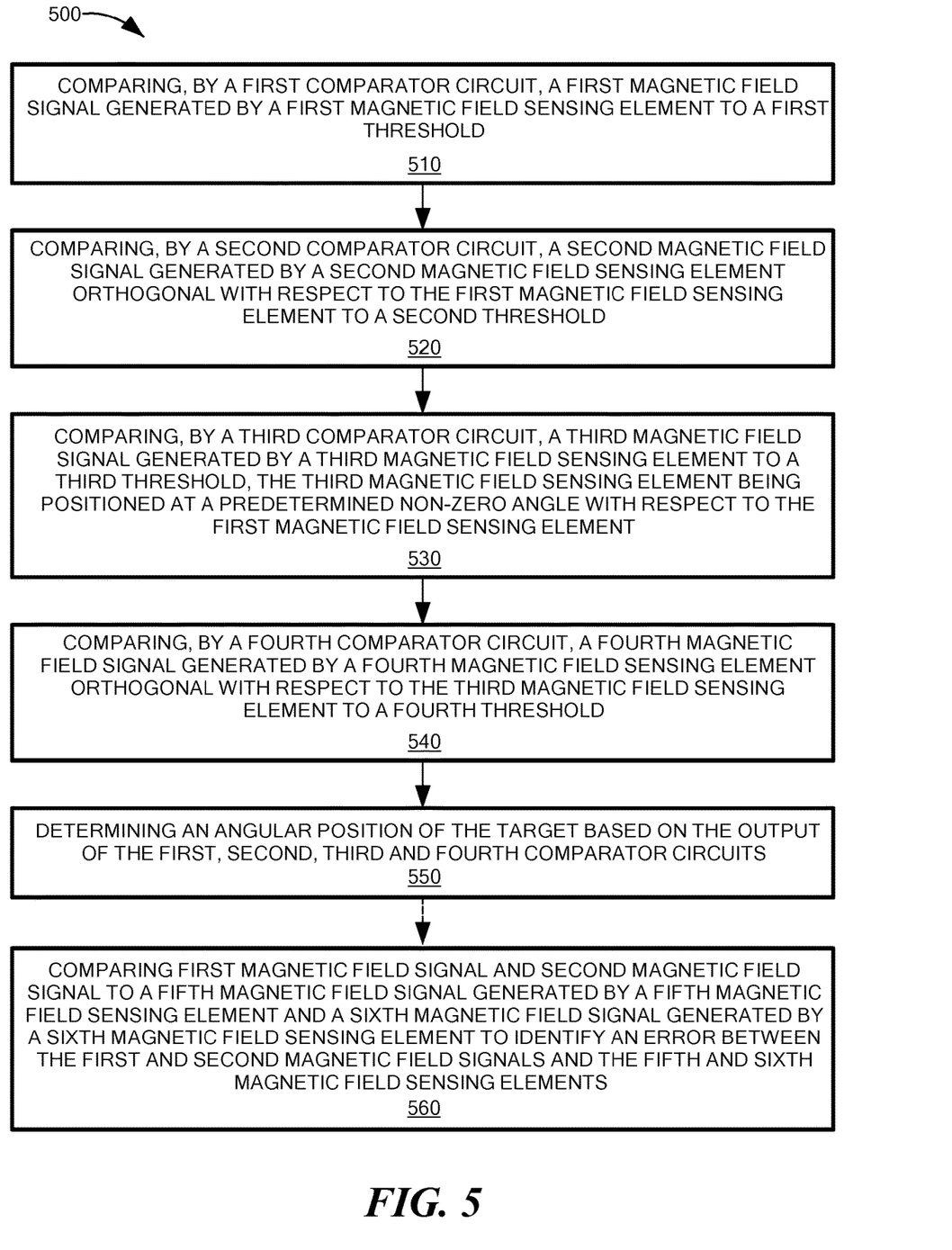
FIG. 5 is a flow diagram illustrating a process for determining an angular position of the target, according to the present disclosure.

FIG. 5 is a flow diagram illustrating a process 500 for determining an angular position of the target, according to the present disclosure. The process commences at block 510 by comparing, by a first comparator circuit (e.g., comparator 142 in FIG. 1B or comparator 147 in FIG. 1B), a first magnetic field signal generated by a first magnetic field sensing element (e.g., element 133 or element 151) to a first threshold. Then, at block 520, a second comparator circuit (e.g., comparator 143 in FIG. 1B or comparator 148 in FIG. 1B) compares a second magnetic field signal generated by a second magnetic field sensing element (e.g., element 134 or element 152) to a second threshold. At block 530, a third comparator circuit (e.g., comparator 147 in FIG. 1B or comparator 142 in FIG. 1B) compares a third magnetic field signal generated by a third magnetic field sensing element (e.g., element 151 or 133 in FIG. 1A) to a third threshold. At block 540, a fourth comparator circuit (e.g., comparator 148 or 143 in FIG. 1B) compares a fourth magnetic field signal generated by a fourth magnetic field sensing element (e.g., element 152 or 134 in FIG. 1A) to a fourth threshold. At block 550, an angular position of the target is determined, for example by signal processing circuitry 165 in FIG. 1A, based on the output of the first, second, third, and fourth comparator circuits (e.g., 142, 143, 147, 148 in FIG. 1B).

In some embodiments, according to an optional block 560, the first and second magnetic field signal generated by the first and second magnetic field sensing elements (e.g., elements 133, 134) can be compared to a fifth magnetic field signal and a sixth magnetic field signal generated by fifth and sixth magnetic field sensing elements (e.g., elements 125, 126 in FIG. 1A) to identify an error between the first and second magnetic field signals and the fifth and sixth magnetic field signals. In some instances, an error signal can be output if the position detected by the first and second magnetic field signals does not match or otherwise properly correlate to the position detected by the fifth and sixth magnetic field signals.

FIG. 6 is a flow diagram illustrating a process 600 for transitioning from full power mode to low power mode and then returning to full power mode, according to the present disclosure. At block 610, the sensor is in the full power mode of operation. Information from the fifth and sixth magnetic field sensing elements (e.g., elements 125, 126 in FIG. 1A) is acquired during the full power mode of operation. The angle, and therefore the turns counter, is processed from the magnetic field sensing elements 125, 126. Internally, an "extended Turns Counter" is kept, which contains information of octant position derived from the angle.

At block 620, the sensor transitions to low power mode (LPM), for example by the key of a vehicle or the engine being turned off. At block 622, the information from the fifth and sixth sensing elements stops being processed with the latest extended Turns Counter value being stored. At block 624, the octant information from the first, second, third and fourth magnetic field sensing elements (e.g., 133, 134, 151, 152) are processed. At block 626, the extended Turns Counter octant value and the first LPM octant value are stored.

At block 630, the sensor is within the low power mode (LPM) of operation. At block 632, the turns counter is updated every new octant information relative to the previous octant information. At block 634, the first measurement during LPM is compared to the first measurement during transition to LPM. Any changes in the position are accounted for and given to the signal processing circuitry (e.g., 165 in FIG. 1A). The Turns Counter is incremented or decremented with every new octant information relative to the prior octant information.

At block 640, the sensor transitions back to full power mode. At block 642, the signal processing circuitry (e.g., 165 in FIG. 1A) stops processing information from the first, second, third, and fourth magnetic field sensing elements since the TMR path (elements 125, 126) has an absolute relation to the extended Turns Counter (the octant of the TMR matches the octant information in that register), on the very first angle sample from the TMR path, the process advances to block 644. At block 644, one of three possible conditions occurs: (1) if the fifth and sixth octant matches the extended octant, the turns counter remains the same; (2) if the fifth and sixth octant does not match the extended octant, the turns counter is updated to obtain the turns counter word; and (3) an error flag is set if the direction cannot be determined (e.g., if the distance from the extended Turns Counter's octant to the new TMR octant is exactly 4, which is the same clockwise and counterclockwise). This could be further constrained to less than 4, for example 2, to only allow for +/−1 octant of separation, or an error flag is set.

In cases where the turns count is relative to an initial quadrant (a whole turn will be detected when the angle turns and gets back to the initial quadrant detected), then a few modifications can be provided. On the very first angle after the sensor enters full power mode, the initial quadrant is stored. Accordingly, at any time in full power mode, the TMR octant will match the Extended Turns Counter plus the initial quadrant. On the transitions back to full power the very first angle sample from the TMR path will be compared to the extended Turns Counter plus the initial quadrant. From that comparison it can determined if the TMR octant matches the extended Turns Counter octant. Likewise, if the initial value is relative to an octant, then the initial octant would be used instead of the initial quadrant.

All references cited herein are hereby incorporated herein by reference in their entirety.

Having described various embodiments, it will now become apparent to one of ordinary skill in the art that other embodiments incorporating their concepts may be used. Elements of different embodiments described herein may be combined to form other embodiments not specifically set forth above. Various elements, which are described in the context of a single embodiment, may also be provided separately or in any suitable subcombination. Other embodiments not specifically described herein are also within the scope of the following claims. Therefore, these embodiments should not be limited to disclosed embodiments, but rather should be limited only by the spirit and scope of the appended claims.

What is claimed is:

1. A magnetic field sensor configured to detect an angle of a target, the magnetic field sensor comprising:
    a first channel comprising a first magnetic field sensing element and a second magnetic field sensing element orthogonal with respect to the first magnetic field sensing element to produce respectively, first and second magnetic field signals;
    a second channel comprising a third magnetic field sensing element and a fourth magnetic field sensing element orthogonal with respect to the third magnetic field sensing element to produce respectively, third and fourth magnetic field signals, wherein the third magnetic field sensing element is positioned at a predetermined non-zero angle with respect to the first magnetic field sensing element;
    a low power mode circuit comprising a converter circuit, wherein the converter circuit is coupled to the first and second magnetic field sensing elements and configured to compare the first magnetic field signal to a first threshold and the second magnetic field signal to a second threshold, wherein the converter circuit is coupled to the third and fourth magnetic field sensing elements and configured to compare the third magnetic field signal to a third threshold and the fourth magnetic field signal to a fourth threshold; and
    a processor configured to use an output of the converter circuit to determine the angle of the target.

2. The magnetic field sensor of claim 1, wherein the converter circuit comprises a first comparator coupled to the first magnetic field sensing element and configured to compare the first magnetic field signal to the first threshold, a second comparator coupled to the second magnetic field sensing element and configured to compare the second magnetic field signal to the second threshold, a third comparator coupled to the third magnetic field sensing element and configured to compare the third magnetic field signal to the third threshold, and a fourth comparator coupled to the fourth magnetic field sensing element and configured to compare the fourth magnetic field signal to the fourth threshold.

3. The magnetic field sensor of claim 2, wherein the first comparator, the second comparator, the third comparator, and the fourth comparator each comprise a zero-crossing detector.

4. The magnetic field sensor of claim 3, wherein the first comparator, the second comparator, the third comparator, and the fourth comparator each comprise a one-bit analog-to-digital converter (ADC).

5. The magnetic field sensor of claim 4, wherein a clockwise step of each ADC corresponds to a respective comparator output transition in a first direction and a counterclockwise step of each ADC corresponds to a respective comparator output transition in a second, opposite direction.

6. The magnetic field sensor of claim 5, further comprising a counter, wherein the processor is further configured to increment the counter each time the clockwise step occurs and to decrement the counter each time the counterclockwise step occurs.

7. The magnetic field sensor of claim 1, wherein the processor is configured to determine to which of at least eight angular ranges the angle of the target corresponds.

8. The magnetic field sensor of claim 7, wherein the processor is configured to output an error signal if consecutive samples of the output of the converter are not within three consecutive angular ranges of each other.

9. The magnetic field sensor of claim 7, wherein the processor is configured to output an error signal when a first angular range of the target indicated by the first or second magnetic field sensing element does not match a second angular range indicated by the third or fourth magnetic field sensing element.

10. The magnetic field sensor of claim 7, wherein:
    the angle of the target is in a first angular range indicative of 0-45 degrees if the first, second, third, and fourth magnetic field signals are greater than zero;
    the angle of the target is in a second angular range of 45-90 degrees if the first, second, and third magnetic field signals are greater than zero, and the fourth magnetic field signal is less than zero;
    the angle of the target is in a third angular range of 90-135 degrees if the first and second magnetic field signals are greater than zero, and the second and fourth magnetic field signals are less than zero;
    the angle of the target is in the fourth angular range of 135-180 degrees if the first magnetic field signal is greater than zero, and the second, third, and fourth magnetic field signals are less than zero;
    the angle of the target is in a fifth angular range of 180-225 degrees if the first, second, third, and fourth magnetic field signals are less than zero;
    the angle of the target is in a sixth angular range of 225-270 degrees if the first, second, and third magnetic field signals are less than zero, and the fourth magnetic field signal is greater than zero;
    the angle of the target is in a seventh angular range of 270-315 degrees if the first and third magnetic field signals are less than zero, and the second and fourth magnetic field signals are greater than zero; and
    the angle of the target is in an eighth angular range of 315-360 degrees if the first magnetic field signal is less than zero, and the second, third, and fourth magnetic field signals are greater than zero.

11. The magnetic field sensor of claim 1, wherein the first and second magnetic field sensing elements comprise vertical Hall plates.

12. The magnetic field sensor of claim 11, wherein at least one of the first channel or the second channel further comprises a fifth magnetic field sensing element and a sixth magnetic field sensing element orthogonal with respect to the fifth magnetic field sensing element.

13. The magnetic field sensor of claim 12, wherein the fifth magnetic field sensing element and the sixth magnetic field sensing element comprise tunnel magnetoresistance (TMR) elements.

14. The magnetic field sensor of claim 1, wherein the predetermined non-zero angle is 45-degrees.

15. A method for detecting an angle of a target, the method comprising:
    comparing, by a converter circuit, a first magnetic field signal generated by a first magnetic field sensing element to a first threshold;
    comparing, by the converter circuit, a second magnetic field signal generated by a second magnetic field sensing element orthogonal with respect to the first magnetic field sensing element to a second threshold;
    comparing, by the converter circuit, a third magnetic field signal generated by a third magnetic field sensing element to a third threshold, the third magnetic field sensing element being positioned a predetermined non-zero angle with respect to the first magnetic field sensing element;

comparing, by the converter circuit, a fourth magnetic field signal generated by a fourth magnetic field sensing element orthogonal with respect to the third magnetic field sensing element to a fourth threshold; and determining an angular position of the target based on an output of the converter circuit.

16. The method of claim 15, wherein determining the angular position is performed during a low power mode of operation of the magnetic field sensor.

17. The method of claim 15, wherein determining the angular position of the target comprises determining to which of at least eight angular ranges the angle of the target corresponds.

18. The method of claim 17, further comprising outputting an error signal if consecutive samples of the output of the first comparator circuit and the output of the second comparator circuit are not within three consecutive angular ranges of each other.

19. The method of claim 15, further comprising comparing the first magnetic field signal and the second magnetic field signal to a fifth magnetic field signal generated by a fifth magnetic field sensing element and a sixth magnetic field signal generated by a sixth magnetic field sensing element to identify an error between the first and second magnetic field signals with respect to the fifth and sixth magnetic field signals, wherein a first channel comprises the first, second, fifth and sixth magnetic field sensing elements, and a second channel comprises the third and fourth magnetic field sensing elements.

20. An apparatus for detecting an angle of a target, the apparatus comprising:

means for comparing a first magnetic field signal generated by a first magnetic field sensing element to a first threshold to provide a first output signal;

means for comparing a second magnetic field signal generated by a second magnetic field sensing element orthogonal with respect to the first magnetic field sensing element to a second threshold to provide a second output signal;

means for comparing a third magnetic field signal generated by a third magnetic field sensing element to a third threshold to provide a third output signal, the third magnetic field sensing element being positioned a predetermined non-zero angle with respect to the first magnetic field sensing element;

means for comparing a fourth magnetic field signal generated by a fourth magnetic field sensing element orthogonal with respect to the third magnetic field sensing element to a fourth threshold to provide a fourth output signal; and means for determining an angular position of the target based on the first output signal, the second output signal, the third output signal, and the fourth output signal.

21. The apparatus of claim 20, wherein the means for determining the angular position of the target comprises means for determining to which of at least eight angular ranges the angle of the target corresponds.

22. The apparatus of claim 20, further comprising means for comparing the first magnetic field signal and the second magnetic field signal to a fifth magnetic field signal generated by a fifth magnetic field sensing element and a sixth magnetic field signal generated by a sixth magnetic field sensing element to identify an error between the first and second magnetic field signals with respect to the fifth and sixth magnetic field signals, wherein the first, second, third, and fourth magnetic field sensing elements comprise vertical Hall plates, and wherein the fifth and sixth magnetic field sensing elements comprise tunnel magnetoresistance (TMR) elements.

* * * * *

UNITED STATES PATENT AND TRADEMARK OFFICE
CERTIFICATE OF CORRECTION

PATENT NO. : 10,852,161 B2  
APPLICATION NO. : 16/398522  
DATED : December 1, 2020  
INVENTOR(S) : Juan Manuel Cesaretti et al.

Page 1 of 1

It is certified that error appears in the above-identified patent and that said Letters Patent is hereby corrected as shown below:

In the Specification

Column 4, Line 15 delete "positioned a" and replace with --positioned at a--.

Column 6, Line 65 delete "turned" and replace with --turn--.

Column 7, Lines 22-24 delete "TMR elements or other appropriate magnetic field sensing elements or other appropriate magnetic field sensing elements." and replace with --TMR elements or other appropriate magnetic field sensing elements.--.

Column 8, Line 6 delete "165, Manchester" and replace with --165, and Manchester--.

Column 8, Line 32 delete "output" and replace with --outputs--.

Column 8, Line 38 delete "output" and replace with --outputs--.

Column 11, Lines 55-56 delete "first and second" and replace with --first and third--.

Column 11, Line 66 delete "field signals." and replace with --field signals are less than zero, and the fourth magnetic field signal is greater than zero.--.

Column 12, Line 10 delete "(5)," and replace with --(5)),--.

Column 12, Line 28 delete "have same" and replace with --have the same--.

Column 13, Line 45 delete "signal" and replace with --signals--.

Signed and Sealed this  
Ninth Day of November, 2021

Drew Hirshfeld  
*Performing the Functions and Duties of the  
Under Secretary of Commerce for Intellectual Property and  
Director of the United States Patent and Trademark Office*